Figure 1:
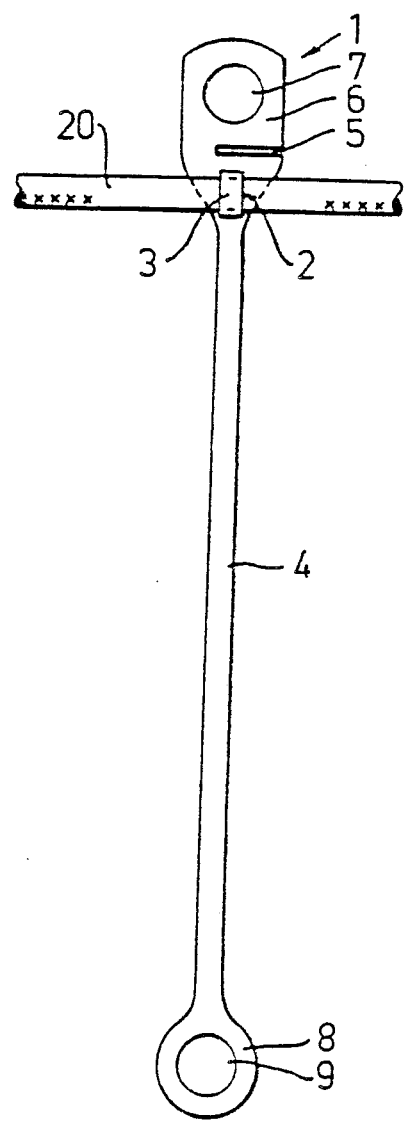

United States Patent [19]

Jönsson

[11] Patent Number: 4,752,054
[45] Date of Patent: Jun. 21, 1988

[54] SUSPENSION MEANS FOR EXTENSION CORDS ETC.

[76] Inventor: Börje Jönsson, Orrskärsgatan 20, Luleå, Sweden, S-951 41

[21] Appl. No.: 36,674
[22] PCT Filed: Jun. 26, 1986
[86] PCT No.: PCT/SE86/00311
 § 371 Date: Feb. 25, 1987
 § 102(e) Date: Feb. 25, 1987
[87] PCT Pub. No.: WO87/00359
 PCT Pub. Date: Jan. 15, 1987

[30] Foreign Application Priority Data

Jul. 2, 1985 [SE] Sweden ............... 8503294

[51] Int. Cl.⁴ .................................. F16L 3/00
[52] U.S. Cl. ................. 248/51; 248/74.3; 24/16 PB
[58] Field of Search ............ 248/51, 52, 60, 62, 248/74.1, 74.3, 74.4; 24/16 R, 16 PB, 30.5 R, 30.5 P; 174/138 R, 168; 242/85.1, 86, 96

[56] References Cited

U.S. PATENT DOCUMENTS

| 2,759,390 | 8/1956 | Edwards | 248/74.3 |
| 2,936,980 | 5/1960 | Rapata | 248/74.3 |
| 3,114,184 | 12/1963 | Bigaouette | 24/30.5 P |
| 3,130,462 | 4/1964 | Mitchell | 24/16 PB |
| 3,339,247 | 9/1967 | Geisinger | 24/16 PB |
| 3,362,411 | 1/1968 | Moller | 24/16 PB |
| 3,368,262 | 3/1971 | Woldman | 248/74.3 |

FOREIGN PATENT DOCUMENTS

| 230292 | 11/1958 | Australia | 24/16 PB |
| 209245 | 5/1960 | Austria | 248/74.3 |
| 952505 | 8/1974 | Canada | 248/51 |
| 1287493 | 2/1962 | France | 24/30.5 P |
| 78595 | 5/1951 | Norway | 248/52 |
| 1002153 | 8/1965 | United Kingdom . | |

Primary Examiner—J. Franklin Foss
Assistant Examiner—Robert A. Olson
Attorney, Agent, or Firm—Holman & Stern

[57] ABSTRACT

A suspension means (1) for extension cords (20) etc., comprising a fastening means (2) for fixing the suspension means (1) to a separate cord (20). The suspension means (1) has further an aperture (7) so that it can be hung e.g. on a nail (30) placed on a wall (31), and it has also a slotted recess (5) and a bendable tongue (4). The tongue (4) is insertable in the recess (5) forming a loop (10) for holding together an optional number of cord loops (21). Thus, the suspension means (1) enables a simple suspension of the cord e.g. onto a wall, possible surplus length of the cord being collected in a suitable number of loops (21). The suspension means (1) is so embodied that it can always remain on the cord and, when necessary, also be moved along it, thanks to which it is available for use.

1 Claim, 4 Drawing Sheets

SUSPENSION MEANS FOR EXTENSION CORDS ETC.

CROSS REFERENCE TO RELATED APPLICATION

This U.S. application stems from PCT International Application No. PCT/SE86/00311 filed June 26, 1986.

This invention relates to a suspension means for extension cords etc.

When using e.g. electric extension cords the cord will usually be lying in loops on a floor due to surplus length and contribute to the ordinary mess thereon. Moreover, the cord is a risk factor for stumbling when lying spread out on the floor and it is also in the risk zone for mechanical damage. Accordingly there is a need of a specially designed means for enabling suspension of the cord e.g. onto a wall, possible surplus length being collected in a suitable number of loops.

It is the object of this invention to provide a suspension means offering a solution of the above-mentioned problem, and this object is achieved by the suspension means having the characteristic features defined in the claims.

One advantage of the suspension means according to the invention is that it is so embodied that it can always remain on the cord and also, when necessary, be moved along the cord, thanks to which it is always available for use. The construction of the suspension means is very simple and it is also very simple to use it.

Figure 2:
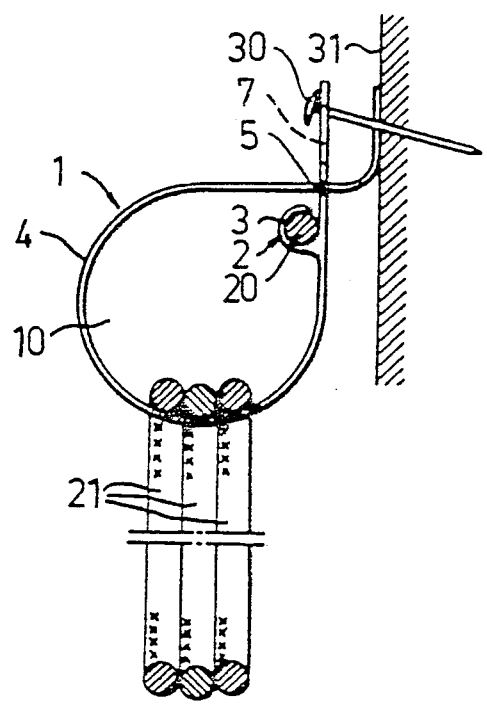
Figure 3:
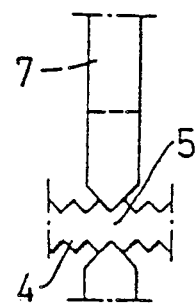
Figure 4:
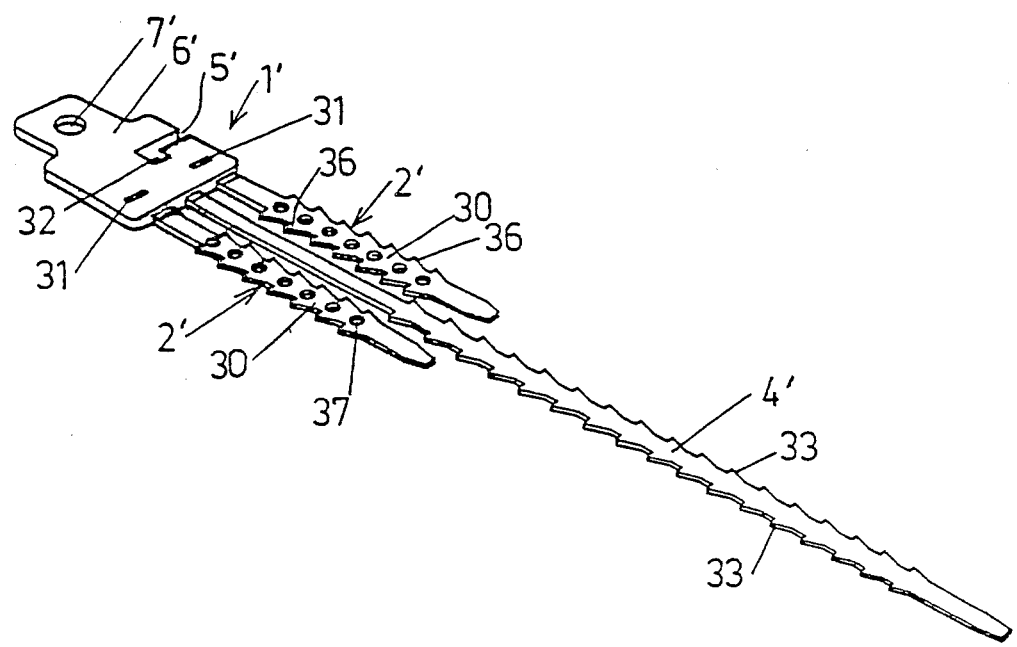
Figure 5:
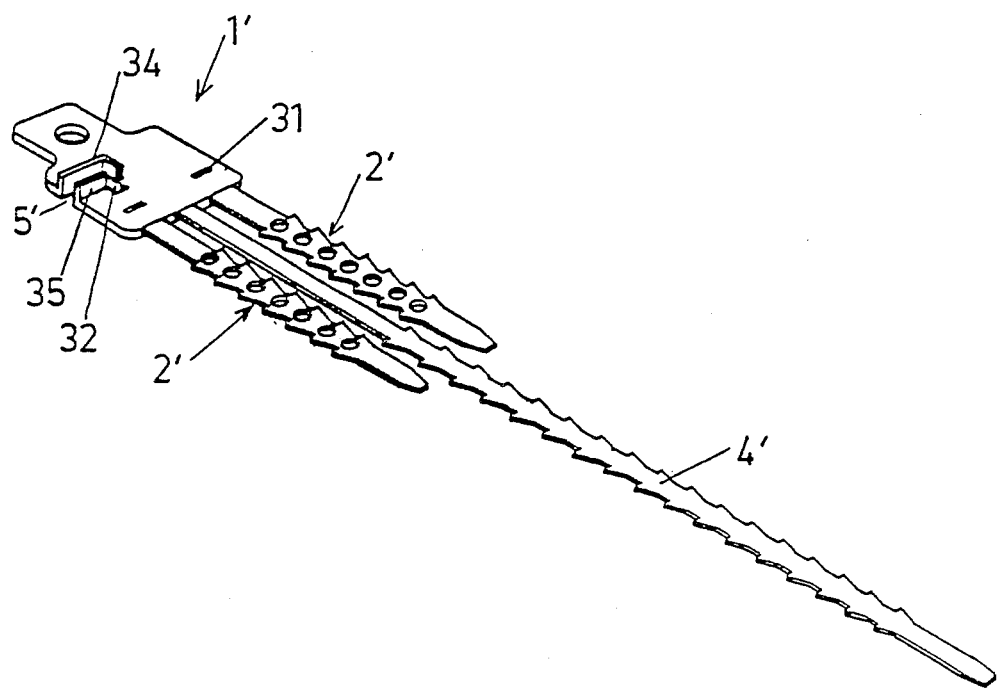

Illustrative examples of the invention will be described below in a greater detail with reference to the enclosed drawings, wherein FIG. 1 is a front view of the inventive suspension means arranged at a cord, FIG. 2 is a lateral view of the suspension means in use, FIG. 3 is a lateral view of a portion from FIG. 2 on a larger scale and FIGS. 4 and 5 are perspective views from two different directions of still another embodiment of an inventive suspension means.

The suspension means 1 according to the invention is preferably made of a flexible plastic material and has a fastening means 2 for fixing the suspension means 1 relative to a cord 20. The fastening means consists preferably of a lug 3 embracing the cord 20, which lug is so resiliently outwardly bendable that the suspension means 1 can be simply placed at a cord 20. Thus the suspension means 1 is attached to the cord 20 even if it occasionally need not be used. Furthermore, the suspension means 1 comprises a tongue 4, a slot 5 and a suspension hole 7 arranged in the base portion 6 of the tongue. The tongue 4 can be of uniform thickness and in that case it should have a thickness that exceeds the width measure of the slot 5 to some extent so that the tongue remains in the slot when inserted therein. However, it may be suitable to form the tongue 4 and the slot 5 as shown in FIG. 3 as the tongue will remain in the slot 5 more safely in this embodiment. Further, it is suitable that the tongue 4 has a hole 9 at its tip portion 8 which e.g. can serve as "spare hole" at suspension.

The surplus length of a cord 20 on a certain occasion of use is wound in a number of loops 21 of a suitable size and is fixed in the loop 10 formed when the tongue 4 is inserted into the slot. Of course the size of the loop 10 can be varied as required and desired. Thanks to the hole 7 the suspension means 1 can be simply hung e.g. onto a nail 30 on a wall 31.

The suspension means 1 is always available on the cord 20 and a desired cord length can be simply obtained by varying the number of loops 21 held together in the loop 10.

In the embodiment shown in FIGS. 4 and 5 the suspension means 1' has two fastening means 2' for a separate cord 20. The fastening means 2' comprises a tongue 30 and an aperture 31 in which the tongue 30 can be inserted so that it embraces a separate cord 20. The suspension means 1' has further a suspension hole 7', a tongue 4' and a slot 5'. As is apparent from the figures the slot 5' has the form of an angle so that its interior portion 32 can fix the tongue 4' in a suitable position, a loop formed by the tongue 4' supporting a desired number of cord loops 21. The tongue 4' has a number of teeth 33 along its edges to provide engagement with the interior portion 32 of the slot 5'. Two shoulders 34, 35 arranged at the slot 5' prevent the tongue 4' from getting out of its engagement with the slot 5' unintentionally. The shoulder 34 is formed as an angle. The shoulders 34, 35 face the same direction as the tip of the tongue 4' inserted in the slot 5'. The tongues 30 have also a number of teeth 36 along their edges to provide an effective engagement with the apertures 31. Moreover, the tongues 30 have a number of holes 37.

Other applications for the suspension means of the invention than that mentioned above are of course possible.

The invention is not restricted to what has been shown and described but amendments and modifications thereof are possible within the scope of the appended claims.

What is claimed is:

1. A suspension means for extension cords and the like, comprising:
    a base portion provided proximate a top portion thereof with a first aperture therethrough for hanging the suspension means over the head of a nail or the like;
    a bendable first tongue integrally formed with the base portion and extending from a bottom edge thereof, side edges of the first tongue being provided with a plurality of teeth therealong;
    a slot provided in said base portion for receiving said first tongue therein, the slot being angled and opening to a side edge of said base portion and having an interior portion for co-operatively engaging the teeth of said first tongue, said interior portion having an upper shoulder extending rearwardly from said base portion and defining an upper portion of said slot, the upper shoulder having a first wall portion extending transversely and inwardly from the side edge of said base portion towards a center of said base portion and a second wall portion extending downwardly from an inner end of said first wall portion at an angle thereto and in the direction of extension of said first tongue, said interior portion further having a lower shoulder defining a lower portion of said slot and extending transversely and inwardly from the side edge of said base portion towards the second wall portion of said upper shoulder, a downwardly extending open portion of said slot separating an inner end of said lower shoulder and said second wall portion of said upper shoulder, a transversely extending open portion of said slot separating said lower shoulder and said first wall portion of said upper shoulder;

at least one bendable second tongue integrally formed with the base portion and extending from the bottom edge thereof parallel to and at a distance from said first tongue, each said second tongue being provided with a plurality of teeth along side edges thereof; and at least one aperture provided in said base portion and extending therethrough for receivably engaging a corresponding one of said second tongues therein.

* * * * *